United States Patent [19]

May

[11] 4,297,896

[45] Nov. 3, 1981

[54] FIELD REPLACEABLE ELECTRODE ASSEMBLY FOR MAGNETIC FLOWMETER

[75] Inventor: George H. May, Philadelphia, Pa.

[73] Assignee: Emerson Electric Co., St. Louis, Mo.

[21] Appl. No.: 65,169

[22] Filed: Aug. 9, 1979

[51] Int. Cl.³ .............................................. G01F 1/58
[52] U.S. Cl. ................................................ 73/861.12
[58] Field of Search ....................... 73/861.12–861.16, 73/272 R; 310/11; 324/207

[56] References Cited

U.S. PATENT DOCUMENTS

| 3,400,582 | 9/1968 | Warner | 73/181 |
| 3,771,361 | 11/1973 | Reznick | 73/861.12 |
| 3,813,938 | 6/1974 | Grosch et al. | 73/861.12 |
| 3,924,466 | 12/1975 | Medlar | 73/861.12 |
| 4,079,626 | 3/1978 | Gardner | 73/861.16 |
| 4,181,013 | 1/1980 | Wada | 73/861.12 |

Primary Examiner—Herbert Goldstein
Attorney, Agent, or Firm—Polster, Polster and Lucchesi

[57] ABSTRACT

A field replaceable electrode assembly for a magnetic flowmeter or the like in which an electrode may be readily installed in and sealed relative to a fitting provided on a meter body from the exterior of the meter body.

11 Claims, 4 Drawing Figures

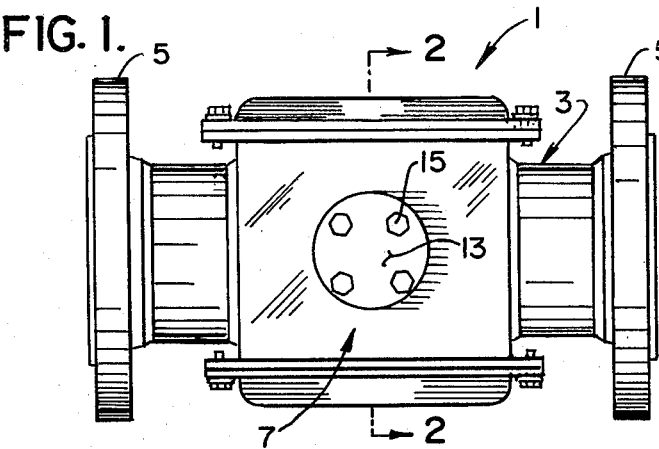
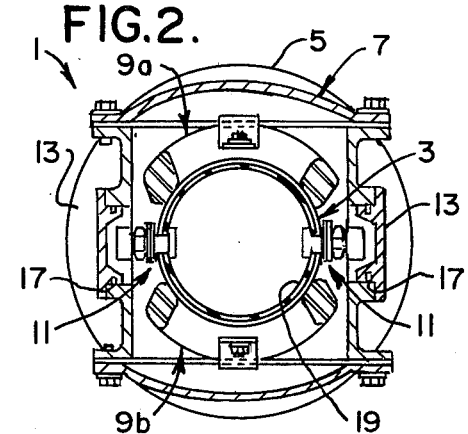
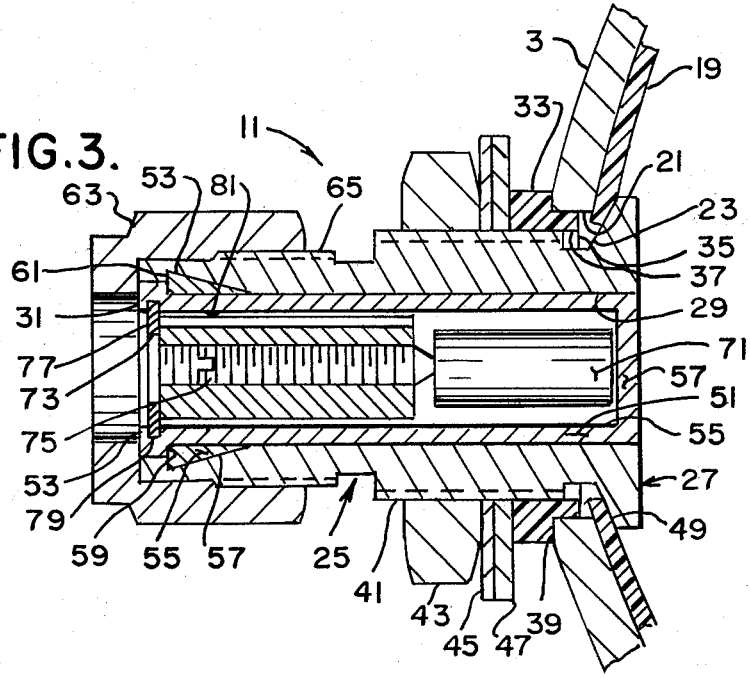
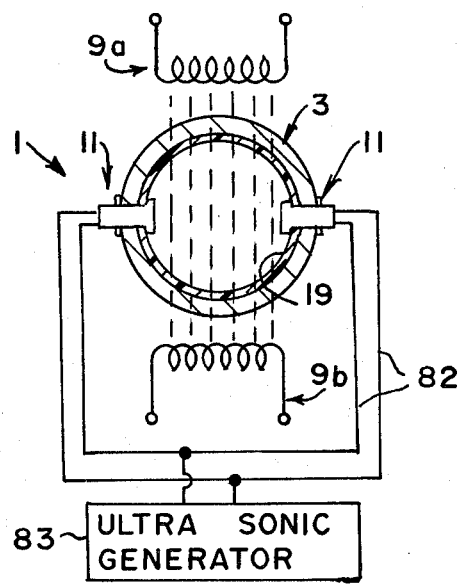

FIELD REPLACEABLE ELECTRODE ASSEMBLY FOR MAGNETIC FLOWMETER

BACKGROUND OF THE INVENTION

This invention relates to an electrode assembly for a magnetic flowmeter or the like, and in particular to such an electrode assembly in which the electrode can be positively sealed in place and in which the electrode can be readily removed and replaced from the exterior of the meter body.

Typically, a magnetic flowmeter includes a meter body adapted to be connected in a flow pipe, the flow through which is to be measured. Magnetic coils are mounted on the meter body and are excited so as to generate a suitable magnetic field across the body. Two meter electrode assemblies are mounted on opposite sides of the body for sensing the voltage induced in a conductive fluid flowing through the magnetic field within the meter body. The voltage is proportional to flow and is suitably amplified to produce a signal indicative of flow.

Each electrode assembly typically includes an electrode and means for mounting the electrode through the meter body into contact with a conductive fluid in the meter body. Because the meter body is typically made of an electrically conductive material, the electrode is electrically insulated from the meter body. Generally, a liner of non-conductive material is provided in the meter body and a sleeve of non-conductive material is provided around the electrode. The liner may be rigid or compliant, and may be made of a number of materials, such as polytetrafluorethylene, polyurethane, butyl rubber, or ceramics. In some designs, the liner does not line the entire flow passage through the meter body, but consists of coated areas in the region of the electrodes. Such a construction is shown in U.S. Pat. No. 3,194,068, to Mannherz et al., for example. Regardless of the type of liner, however, it is essential that the electrode be positively sealed relative to the meter body.

In some electrode assemblies, such as is shown in U.S. Pat. No. 3,194,068, the electrode has at its inner end a head or skirt part which bears against the liner replacement of the electrode require that the electrode be removed from the interior of the meter body. This necessitates that the meter body be disconnected from the flow pipe system.

In other known electrode assemblies, complicated and expensive constructions were utilized to sealably hold the electrode in place on the meter body and to permit the installation of the electrode from the exterior of the meter body. In U.S. Pat. No. 3,171,990, for example, expansion of a sleeve by a conical electrode is relied upon to seal the electrode.

Sealing the electrode is more difficult with some liner materials than others. When the liner material is polytetrafluoroethylene, it has been found essential to provide a skirt on the inner end of the electrode to provide an adequate seal, and the electrodes have not been removable from outside the meter body.

In certain applications, for example when measuring sewage flow, the exposed faces of the electrodes must be repeatedly cleaned. To clean the electrode while in place in the meter body, ultrasonic cleaning techniques have been used. In one known version of an electrode adapted to be ultrasonically cleaned, shown in U.S. Pat. No. 3,479,873, to Hermanns, an ultrasonic transducer engages the electrode outside of the meter body and excites the entire electrode so as to clean its inner end which is exposed to the fluid flow within the meter body. In another ultrasonically cleaned electrode arrangement shown in U.S. Pat. No. 3,771,361, to Reznick, the ultrasonic transducer is positioned in a blind bore in the electrode, and bears on a relatively thin wall behind the exposed electrode face. Although this latter approach has substantial advantages, it does not permit the electrode to be removed without disassembling the meter from its flow pipe system.

One of the objects of this invention is to provide an electrode assembly for a magnetic flowmeter or the like in which the electrode may be readily changed from the exterior of the meter body (i.e., a field replaceable electrode).

Another object is to provide such an electrode assembly in which the electrode may be readily and positively sealed with respect to its holder.

Another object is to provide an electrode which may be effectively and efficiently cleaned in situ by ultrasonic cleaning apparatus.

Another object is to provide an electrode assembly which may be readily used with meter bodies having various electrical insulation liners or coatings on the inner surfaces thereof.

Another object is to provide an electrode assembly which enables the user to switch to an electrode including no ultrasonic cleaning means and an ultrasonically cleaned electrode without disassembling the flowmeter.

Another object is to provide an electrode assembly in which the electrode is positively electrically insulated with respect to the meter body.

Another object is to provide an electrode assembly which is of relatively simple and economical construction and yet is able to withstand relatively high operating pressures without leakage.

Other objects will be in part apparent and in part pointed out hereinafter.

SUMMARY OF THE INVENTION

In accordance with this invention, briefly stated, an improved electrode assembly for a magnetic flowmeter or the like is provided which is adapted to be sealably installed on or removed from a meter body having an opening therethrough for accommodating the electrode assembly. The electrode assembly comprises a fitting adapted to be sealably secured in the opening through the meter body and to extend outwardly therefrom with the fitting having an axial bore therethrough. The electrode assembly further comprises an electrode adapted to be inserted in and to be removed from the bore of the fitting from the exterior of the meter body, the electrode being held within the bore in a sensing position in which it is in sensing relation with fluid flowing through the meter body. Further, means is provided for sealing the electrode with respect to the fitting.

BRIEF DESCRIPTION OF THE DRAWINGS

FIG. 1 is a side elevational view of a magnetic flowmeter including the electrode assembly of the present invention;

FIG. 2 is a vertical cross sectional view of FIG. 1 taken along line 2—2 illustrating an explosion-proof housing enclosing the magnetic flowmeter on its meter housing, with the magnetic flowmeter being shown to generally include a pair of electro-magnets disposed on opposite sides of the meter body and a pair of electrode assemblies of the present invention diametrically opposed to one another on the meter body between the magnets;

FIG. 3 is an enlarged longitudinal cross-sectional view of the electrode assembly of the present invention; and FIG. 4 is a diagrammatic view of a magnetic flowmeter in which electrode assemblies of the present invention are ultrasonically cleaned.

Corresponding reference characters indicate corresponding parts throughout the several views of the drawings.

DESCRIPTION OF PREFERRED EMBODIMENTS

Referring now to the drawings, a magnetic flowmeter of the present invention is indicated in its entirety at 1 and is best shown in FIGS. 1 and 4. The flowmeter is shown to comprise a meter body 3 which may, for example, be a pipe spool having pipe flanges 5 at each end thereof so as to permit the flowmeter to be readily incorporated (i.e., bolted in place) in a flow pipe system through which flows an electrically conductive fluid whose flow rate is to be measured. As is typical, meter body 3 is free from obstructions to the flow of fluid therethrough and thus does not in any significant way interfere with or disturb the flow of fluid therethrough and it does not constitute any substantial restriction or pressure drop to the flow of fluid therethrough. As indicated at 7 (see FIG. 1), an explosion proof housing at least in part surrounds the meter body and encloses the main components of the magnetic flowmeter. As shown in FIG. 2, housing 7 encloses a pair of coil magnets 9a and 9b which are held in place on opposite sides of the meter body and which are maintained firmly in engagement with the exterior of the meter body or pipe spool. These coils constitute electro-magnets which generate a magnetic field of desired magnetic flux and characteristics (as illustrated by the dotted lines in FIG. 4) within the meter body and in the interior thereof. Preferably, the meter body is made of a selected ferromagnetic material and it serves as a core or return path for the magnetic field generated by magnets. The magnets may be driven in any number of well known manners which are not per se a part of the present invention and thus are not herein described in detail.

As further shown in FIGS. 2 and 4, magnetic flowmeter 1 includes a pair of electrode assemblies of the present invention, each of which is generally indicated at 11, with electrode assemblies being diametrically opposed to one another on opposite sides of the meter body and being essentially located midway between magnets 9a and 9b. Housing 7 is provided with a pair of removable cover plates 13, one for each electrode assembly 11, which permit service personnel to access electrode assemblies 11 located immediately behind these cover plates. The cover plates are securely bolted to housing 7 by bolts 15 and are sealed relative thereto by means of O-rings 17, as shown in FIG. 2.

As is further shown in FIG. 2, an electrical insulating liner 19 of suitable electric insulation material is provided on the inside of meter body 3. Liner 19 covers the entire inner surface of the meter body. However, it will be understood that in other magnetic flowmeter designs, it may only be necessary to cover the inside of the meter body proximate the location of electrode assemblies 11. More specifically, insulating liner 19 is preferably a suitable synthetic resin material, such as polytetrafluorethylene sold by DuPont under the registered trademark Teflon. This liner may be bonded or cemented to the inner surface of the pipe spool constituting the meter body in such manner as to prevent the leakage or flow of fluid between the liner and the meter body. Holes or openings 21 (see FIG. 3) are provided in opposite walls of the meter body so as to receive a corresponding electrode assembly 11 of the present invention. A mating opening 23 is provided in liner 19 in register with their respective openings 21 in the walls of the meter body.

Generally, an electrode assembly 11 comprises a fitting 25 having an inner head 27 and a bore 29 extending longitudinally therethrough. An electrode, as generally indicated at 31, is received within bore 29 of the fitting with one end of the electrode (i.e., its inner end) being in sensing relation with fluid flowing through the meter body when the electrode is in its installed position (as best shown in FIG. 3). As shown in FIG. 3, head 27 of fitting 25 is appreciably larger than openings 21 and 23 in meter body 3 and liner 19, respectively, and thus the head overlies or covers a portion of the liner surrounding opening 23 therethrough. Preferably (but not necessarily) head 27 is shaped to fit the curvature of liner 19 and of the meter body. This is especially desirable in smaller sized flowmeters in which curvature of the meter body is more pronounced.

Fitting 19 is held centered within its respective opening 23 through the meter body by means of an insulator washer 33. The latter has a lip 35 which is received in opening 23 and a central bore 37 extending longitudinally therethrough for reception of the fitting. Insulator washer 33 is preferably fabricated from a rigid electrical insulation material, such as a fiber reinforced plastic or the like. It will be appreciated that insulator washer 33 electrically insulates fitting 25 and electrode 31 from meter body 3. A respective flat surface 39 is provided on the exterior of the meter body surrounding openings 21 therein. Fitting 25 further has threads 41 on its outer surface. A retaining nut 43 is threaded on the fitting and is engageable with these exterior threads. Further, a flat spring washer 45 (e.g., a Bellville spring washer) is interposed between retainer nut 43 and insulator 33. A flat washer 47 may be placed between the spring washer and insulator washer 33 so as to prevent a hard bearing surface for the spring washer. Upon tightening retainer nut 43, head 27 of fitting 25 is drawn into leak-tight sealing engagement with liner 19. As shown, head 27 has a continuous sealing surface 49 on its inner face which sealingly engages liner 19 so as to form a positive seal therewith when retaining nut 43 is tightened. In this manner, fitting 25 is sealed relative to liner 19.

Electrode 31 is made of suitable electrically conductive material and it has a shank portion 51 and an enlarged outer head 53. A blind bore 55 extends longitudinally through the electrode from head 53 toward its inner closed end 57. AS shown, the inner end 57 of the electrode is relatively thin for purposes as will appear.

Electrode 31 is sealingly fitted in bore 29 of fitting 25. A shoulder 59 is provided between head 53 and shank 51 of the electrode. The outer end of fitting 25 has an outwardly flared seat 53 in its bore 29. A sealing collar 55 of suitable metal or the like is slidably received on the exterior surface of electrode shank 51. This sealing collar has a tapered outer surface 57 which mates with seat 53 and with an outer end 61 of the collar which is engageable by shoulder 59 on the electrode. A cap nut 63 threadably engages external threads 65 provided on fitting 25. The inner surface of the cap nut abuts the end of electrode 31 and jams collar 55 into sealing engagement with shoulder 59 and with seat 53 thereby to seal the electrode with respect to fitting 25.

An ultrasonic transducer, as generally indicated at 71, is received within bore 55 of electrode 31 and is directly engageable with the inner face of the inner closed end 57 of the electrode so that upon energization of the ultrasonic transducer, ultrasonic energy is input directly to the portion of the electrode to be cleaned (i.e., its inner end). Transducer 71 is held in place by means of a retainer 73 and set screw 75 threadable carried by the retainer. A removable snap ring 77 which fits in a groove 79 formed within the electrode holds the retainer in place in the electrode bore. As indicated at 81, a slot is provided in the retainer for the passage of leads 82 (as best shown in FIG. 3) so that the transducer may be energized by means of an ultrasonic generator 83.

It will be understood that if the liquid whose flow rate is to be measured does not present any problem of fouling the electrode, the provision of ultrasonic cleaning means may not be necessary. Thus, another electrode without ultrasonic cleaning means may be readily inserted in place of electrode 31 without the necessity of access to the interior of meter body 3.

Prior to installation of meter body 3 in the piping system whose flow rate is to be measured, fitting 25 of each electrode assembly 11 is inserted through its respective opening 23 in liner 19 and through its respective opening 21 in the wall of the meter body from the inside of the meter body and head 27 is brought into engagement with the liner. Then, insulator washer 33 is inserted in opening 21 so as to surround the fitting and to center the fitting within the opening. Washer 47 is fitted in place on the insulator and spring washer 45 and retaining nut 43 are then installed. The retaining nut is then drawn tight so as to forcefully draw head 27 into sealing engagement with liner 19 and so as to force its sealing rim 49 into biting sealing engagement with the liner. Also, tightening of the retaining nut compresses spring washer 45 thereby to resiliently maintain head 27 in sealing engagement with the liner. The electrode is inserted in bore 29 of fitting 25 and cap nut 63 is tightened thereby to sealingly secure electrode 31 within fitting 25 in a sensing position so as to sense the electrical field induced within the fluid flowing through the meter body. Further, collar 55 is compressed thereby to positively make a seal between fitting 25 and electrode 31.

It will be noted that the electrodes 31 of electrode assembly 11 are readily field replaceable without the necessity of access to the electrode from the interior of meter body 3. In electrode assembly 11, electrode 31 may be replaced by unscrewing cap nut 63 and by removing the electrode from bore 29 of fitting 25. Upon installation, electrode 31 is merely inserted into the bore of the fitting and the cap nut an as it is tightened. Thus, its outer end 57 is brought into sensing relation with fluid flowing through the meter body and its collar 55 is compressed so as to positively seal the electrode with respect to the fitting.

In view of the above, it will be seen that other objects and features of the invention are achieved and other advantageous results are attained.

As various changes could be made in the above constructions without departing from the scope of the invention, it is intended that all matter contained in the description or shown in the accompanying drawings shall be interpreted as illustrative and not in a limiting sense.

I claim:

1. An electrode assembly adapted for a magnetic flowmeter or the like to be sealably installed on or removed from a meter body or the like, said meter body having a liner on the inside thereof of suitable electrical insulation material and an opening therethrough for accommodating said electrode assembly, said electrode assembly comprising a fitting adapted to be sealably secured to said meter body and to extend outwardly therefrom, said fitting having an axial bore therethrough, said assembly further comprising an electrode adapted to be inserted in and removed from said bore from the exterior of said meter body, said electrode being held within said bore in a sensing position in which it is in sensing relation with fluid flowing through said meter body, and means for sealing said electrode with respect to said fitting, said seal comprising a collar slidably received on the exterior of said electrode, said collar having a tapered outer surface, said fitting having a seat engageable with said tapered outer surface of said collar, said electrode having a shoulder engageable with said collar, said electrode assembly further comprising a cap threadably engageable with said fitting and with said electrode for forcing said sealing collar into sealing engagement with said seat and with said electrode and for holding said electrode into said fitting in its sensing position.

2. An electrode assembly as set forth in claim 1 further including means for electrically insulating said fitting from said meter body.

3. An electrode assembly as set forth in claim 2 wherein said insulating means comprises an insulating washer having a portion thereof adapted to fit within said hole and an opening therethrough for reception of said fitting.

4. An electrode assembly as set forth in claim 3 wherein said fitting has a head on its inner end larger than said opening through said liner, said head being sealably engageable with said liner.

5. An electrode assembly as set forth in claim 4 wherein the exterior of said fitting is threaded, and wherein said electrode assembly further includes a retainer nut threaded on said exterior threads on said fitting for drawing said head into sealing engagement with said liner and for securely holding said fitting in position on said meter body.

6. An electrode assembly as set forth in claim 1 wherein said electrode has a blind bore therewithin with the bottom of said bore being in close proximity to the interior of said meter body when said electrode assembly is installed on said meter body, ultrasonic means being receivable within said bore for ultrasonically cleaning the end portion of said electrode without removal of the electrode from said meter body.

7. An electrode assembly as set forth in claim 6 wherein said ultrasonic cleaning means comprises an ultrasonic transducer fitted within said bore in ultrasonic excitation relation with the end of said electrode, said ultrasonic transducer remaining in place within said electrode and being selectively energized so as to effect ultrasonic cleaning of said electrode.

8. An electrode assembly as set forth in claim 1 wherein said liner is of a suitable electrical insulating synthetic resin material surrounding said hole in said meter body.

9. An electrode assembly as set forth in claim 8 wherein said liner is a polytetrafluorethylene resin.

10. An electrode assembly adapted to be sealably installed in a flow pipe, the latter having an opening therethrough, said electrode assembly including a fitting having a longitudinal bore therethrough and an enlarged head at one end of the fitting, said fitting being insertable through said hole in said flow pipe from the interior thereof and said enlarged head being engageable with said flow pipe, electrical insulation means disposed between said flow pipe and said fitting for electrically isolating said fitting from said flow pipe, means for securing said fitting in place on said flow pipe, an electrode insertable into said bore of said fitting with one end of said electrode being in sensing relation with the interior of said flow pipe, said electrode being held within said bore in a sensing position in which it is in sensing relation with fluid flowing through said meter body, and seal means between said electrode and said fitting for preventing the leakage of fluid therebetween, said seal means comprising a collar slidably received on the exterior of said electrode, said collar having a tapered outer surface, said fitting having a seat engageable with said tapered outer surface of said collar, said electrode having a shoulder engageable with said collar, said electrode assembly further comprising a cap threadably engageable with said fitting and with said electrode for forcing said sealing collar into sealing engagement with said seat and with said electrode and for holding said electrode into said fitting in its sensing position.

11. In a magnetic flowmeter comprising a body adapted to be connected in a flow system for measuring the flow of a fluid therethrough, means for generating a magnetic field in said fluid flowing through said body, and at least one electrode assembly fitted on said body for sensing the electric field induced in said fluid flowing through said magnetic field, said body having an opening therethrough for reception of said electrode assembly the improvement wherein: said electrode assembly includes a fitting sealably attached to said body and extending outwardly therefrom, said fitting having an axial bore therethrough, an electrode adapted to be inserted in and removed from the bore of said fitting from the exterior of said body, said electrode being positively held within said bore in a sensing position in which it is in sensing relation with fluid flowing through said body, means for sealing said electrode with respect to said fitting, said seal means comprising a collar slidably received on the exterior of said electrode, said collar having a tapered outer surface, said fitting having a seat engageable with said tapered outer surface of said collar, said electrode having a shoulder engageable with said collar, said electrode assembly further comprising a cap threadably engageable with said fitting and with said electrode for forcing said sealing collar into sealing engagement with said seat and with said electrode and for holding said electrode into said fitting in its sensing position, and means for electrically insulating said electrode from said body.

* * * * *